(12) United States Patent
Wu et al.

(10) Patent No.: US 9,971,109 B1
(45) Date of Patent: May 15, 2018

(54) OPTICAL ELEMENT WITH LIGHT-SPLITTING FUNCTION

(71) Applicant: FORWARD OPTICS CO., LTD., Taichung (TW)

(72) Inventors: Huai-An Wu, Taichung (TW); Wei Shen, Taichung (TW); Yuan-Lin Lee, Taichung (TW)

(73) Assignee: FORWARD OPTICS CO., LTD., Taichung (TW)

( * ) Notice: Subject to any disclaimer, the term of this patent is extended or adjusted under 35 U.S.C. 154(b) by 0 days. days.

(21) Appl. No.: 15/705,352

(22) Filed: Sep. 15, 2017

(30) Foreign Application Priority Data

Jun. 5, 2017 (CN) .......................... 2017 1 0413439

(51) Int. Cl.
*G02B 6/42* (2006.01)
*G02B 6/32* (2006.01)

(52) U.S. Cl.
CPC ............. *G02B 6/4215* (2013.01); *G02B 6/32* (2013.01); *G02B 6/4214* (2013.01)

(58) Field of Classification Search
None
See application file for complete search history.

(56) References Cited

U.S. PATENT DOCUMENTS

| 9,513,448 | B2 * | 12/2016 | Sun | G02B 6/4246 |
|---|---|---|---|---|
| 9,529,164 | B1 * | 12/2016 | Cheng | G02B 6/4214 |
| 9,541,720 | B1 * | 1/2017 | Wu | G02B 6/4286 |
| 9,588,308 | B1 * | 3/2017 | Wu | G02B 6/4214 |
| 2004/0179784 | A1 * | 9/2004 | Vancoille | G02B 6/4214 385/47 |
| 2005/0147353 | A1 * | 7/2005 | Vancoill | G02B 6/4204 385/47 |
| 2006/0159405 | A1 * | 7/2006 | Yajima | G02B 6/4206 385/88 |
| 2006/0180744 | A1 * | 8/2006 | Shen | G02B 5/08 250/208.1 |
| 2010/0265974 | A1 * | 10/2010 | Wang | H01S 5/4025 372/29.011 |
| 2010/0295063 | A1 * | 11/2010 | Morioka | G02B 6/4206 257/80 |
| 2011/0057204 | A1 * | 3/2011 | Morioka | G02B 6/4214 257/84 |
| 2011/0064358 | A1 * | 3/2011 | Nishimura | G02B 6/4214 385/33 |
| 2011/0097037 | A1 * | 4/2011 | Kuznia | G02B 6/4214 385/33 |

(Continued)

*Primary Examiner* — Jerry Rahll
(74) *Attorney, Agent, or Firm* — Fish & Richardson P.C.

(57) ABSTRACT

An optical element includes a lens component and a filter. The lens component has a first plane, a second plane, a third plane, a fourth plane, a fifth plane, a first collimating unit formed on the first plane, a second collimating unit formed on the first plane, and a third collimating unit formed on the third plane. The first, second, third, fourth and fifth planes are disposed around and parallel to a reference axis. The third plane is formed with a groove defined by a sixth plane and a seventh plane which extend obliquely from the third plane and respectively opposite to the first and second planes. Each of the sixth and seventh planes extends in a direction that is parallel to the reference axis. The filter is disposed on the third plane for covering the groove.

8 Claims, 3 Drawing Sheets

(56) References Cited

U.S. PATENT DOCUMENTS

| | | | | |
|---|---|---|---|---|
| 2011/0305415 | A1* | 12/2011 | Kawai | G02B 6/4292 |
| | | | | 385/14 |
| 2012/0063721 | A1* | 3/2012 | Chen | H04B 10/564 |
| | | | | 385/33 |
| 2012/0263416 | A1* | 10/2012 | Morioka | G02B 6/4214 |
| | | | | 385/33 |
| 2014/0133802 | A1* | 5/2014 | Morioka | G02B 6/4286 |
| | | | | 385/33 |

* cited by examiner

OPTICAL ELEMENT WITH LIGHT-SPLITTING FUNCTION

CROSS-REFERENCE TO RELATED APPLICATION

This application claims priority of Chinese Patent Application No. 201710413439.0, filed on Jun. 5, 2017.

FIELD

The disclosure relates to an optical element, and more particularly to an optical fiber adapter.

BACKGROUND

A first conventional optical element with light-splitting function is disclosed in U.S. Pat. No. 9,541,720, and a second conventional optical element with light-splitting function is disclosed in U.S. Pat. No. 9,588,308. The first and second conventional optical elements change an inclination angle of a light-splitting surface to increase the distance between a light source and a photo detector. However, when the distance between the light source and the photo detector is larger than a certain value, it may cause the following disadvantages:

1. The condensation of inclined light beams is low, so that the condensing area of the light beams is larger than the light-receiving area of the photo detector, thereby resulting in reduction of the light energy received by the photo detector. To solve this disadvantage, a larger photo sensor of the photo detector may be used, which may increase the manufacturing cost.

2. The light penetration rate of each light beam from a lens to air is decreased, so that the light coupling efficiency of the light beam into an optical fiber is low. When the inclination angle of the light-splitting surface is larger than the critical angle of total reflection, the light beam is totally reflected by the light-splitting surface, and the photo detector cannot fully receive any light signal.

Therefore, how to increase the distance between the light source and the photo detector without changing the inclination angle of the light-splitting surface becomes an important issue.

A third conventional optical element disclosed in U.S. Pat. No. 6,888,9888 also includes a photo-detecting structure. However, two photo detectors of the third conventional optical element are disposed between a light source and a receiving end of an optical fiber, such that the distance between the light source and the receiving end of the optical fiber is long. A light beam emitted from the light source needs to be reflected by a reflection surface to the receiving end. Since a receiving distance deviation of the receiving end caused by an inclination angle deviation of the reflection surface is proportional to the distance between the light source and the receiving end, the inclination angle deviation of the reflection surface may cause serious receiving distance deviation. The diameter of a receiving end of a conventional optical fiber is only 50-62 micro-millimeters, and when the light beam deviates from the receiving end of the conventional optical fiber, the receiving end of the conventional optical fiber may receive low optical signal or may not receive optical signal, and thereby leading to a failed communication.

SUMMARY

Therefore, the object of the disclosure is to provide an optical element that can alleviate at least one of the drawbacks of the prior art.

According to the disclosure, the optical element includes a lens component and a filter. The lens component has a first plane, a second plane, a third plane, a fourth plane, a fifth plane, a first collimating unit formed on the first plane, a second collimating unit formed on the first plane, and a third collimating unit formed on the second plane. The first, second, third, fourth and fifth planes are disposed around and parallel to a reference axis. The third plane is formed with a groove defined by a sixth plane and a seventh plane which extend obliquely from the third plane and respectively opposite to the first and second planes. Each of the sixth and seventh planes extends in a direction that is parallel to the reference axis. The filter is disposed on the third plane for covering the groove, and has a first side surface facing the sixth and seventh planes, and a second side surface opposite to the first side surface, and facing the fourth plane. When light beams incident from the first collimating unit propagate within the lens component along a first optical path to enter, by refraction through the sixth plane, and propagate within the groove to reach the first side surface, followed by being reflected by the first side surface to reach the seventh plane, a part of the light beams enters, by refraction through the seventh plane, and propagates within the lens component along a second optical path to exit the lens component through the third collimating unit, and the remaining part of the light beams is reflected by the seventh plane to propagate within the groove, to thereby enter and propagate within the filter, by refraction through the first side surface, and subsequently exit the filter, by refraction through the second side surface along a monitoring optical path, followed by entering and propagating within the lens component, by refraction through the fourth plane, to reach the fifth plane to thereby be reflected by the fifth plane to exit the lens component through the second collimating unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
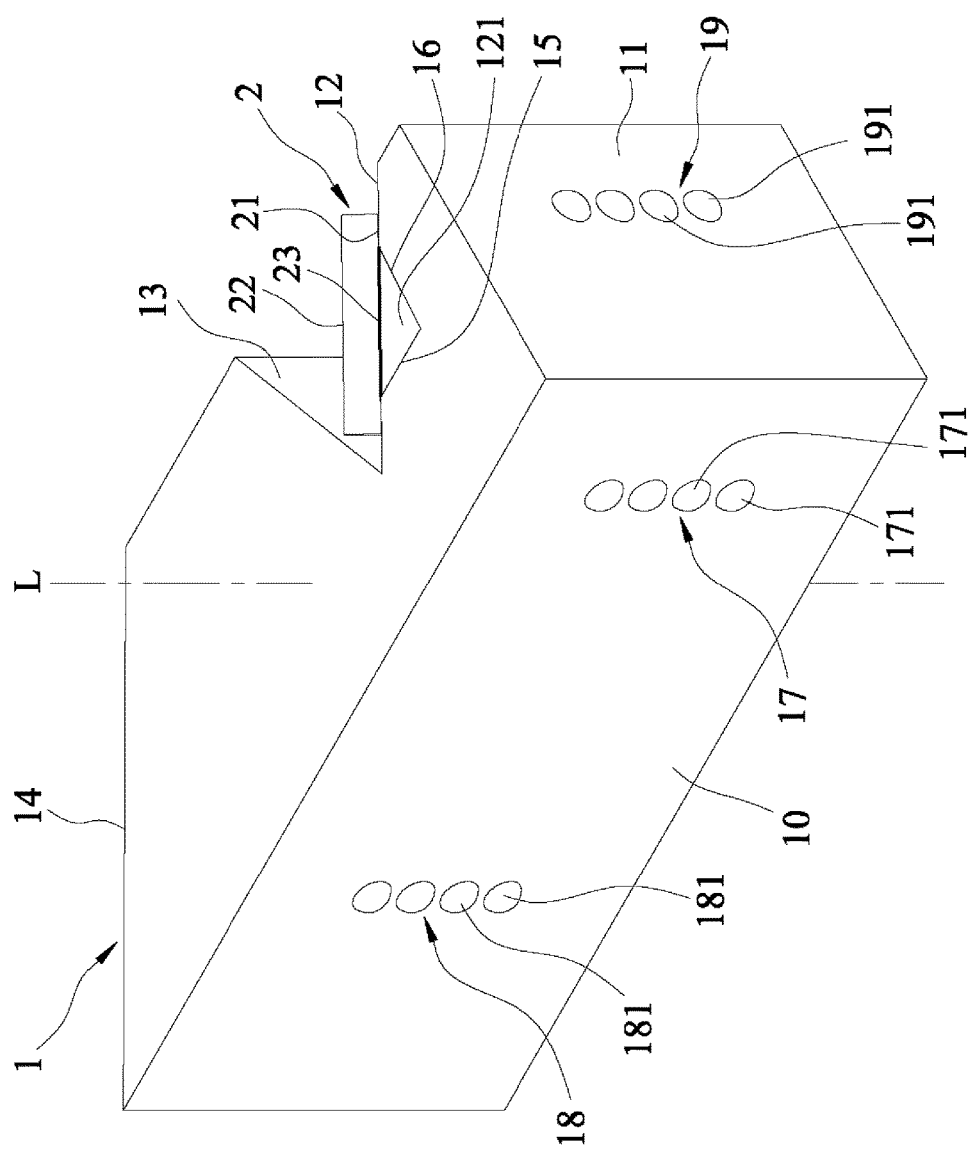
FIG. 1 is a perspective view of an embodiment of an optical element according to the disclosure.
Figure 2:
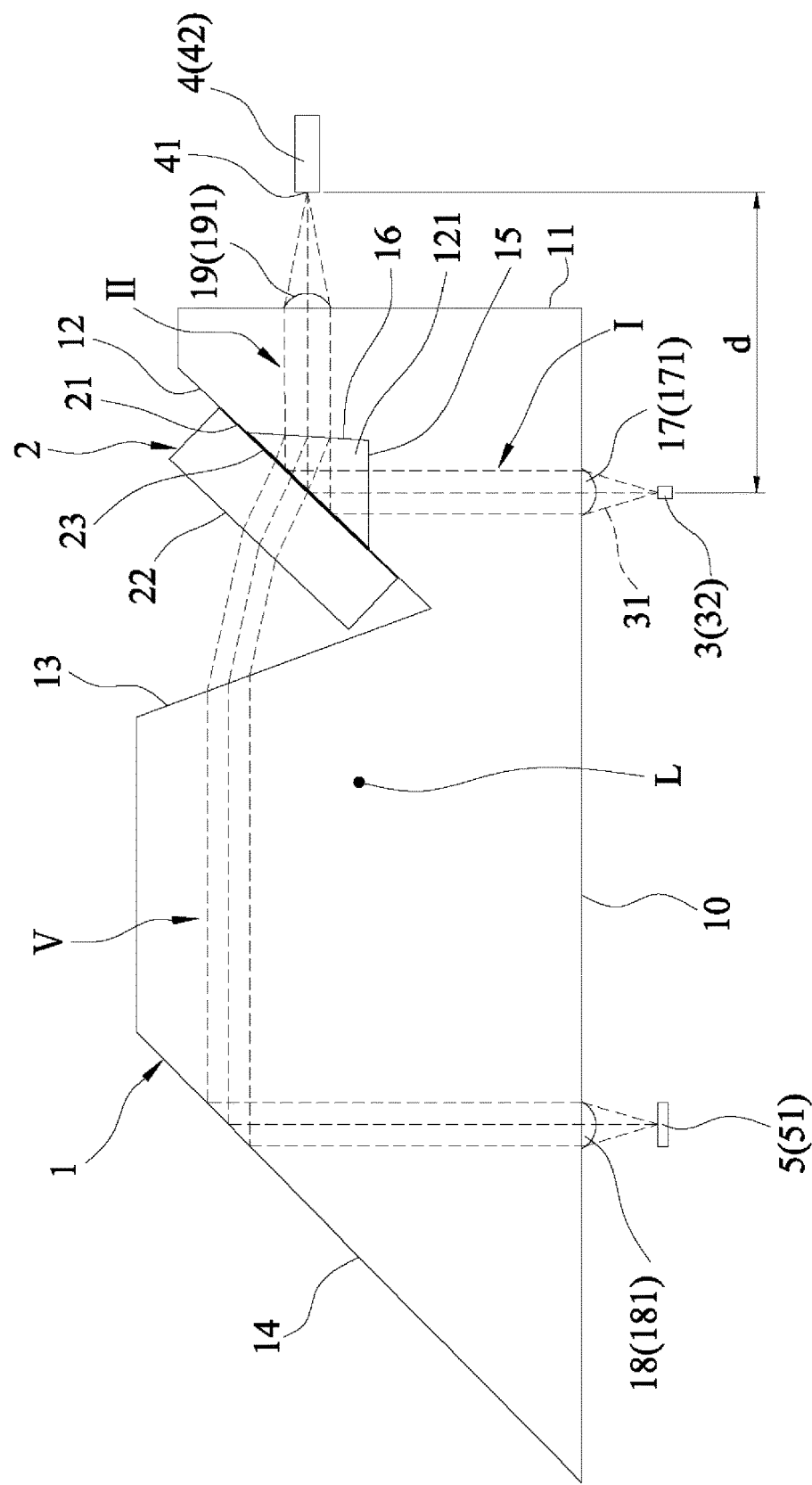
FIG. 2 is a side schematic view of the embodiment, and illustrates that the embodiment is applied to be a multi-channel optical fiber adapter, and the embodiment is in use.

Referring to FIGS. 1 and 2, the embodiment of an optical element with light-splitting function includes a lens component 1 and a filter 2.

Figure 3:
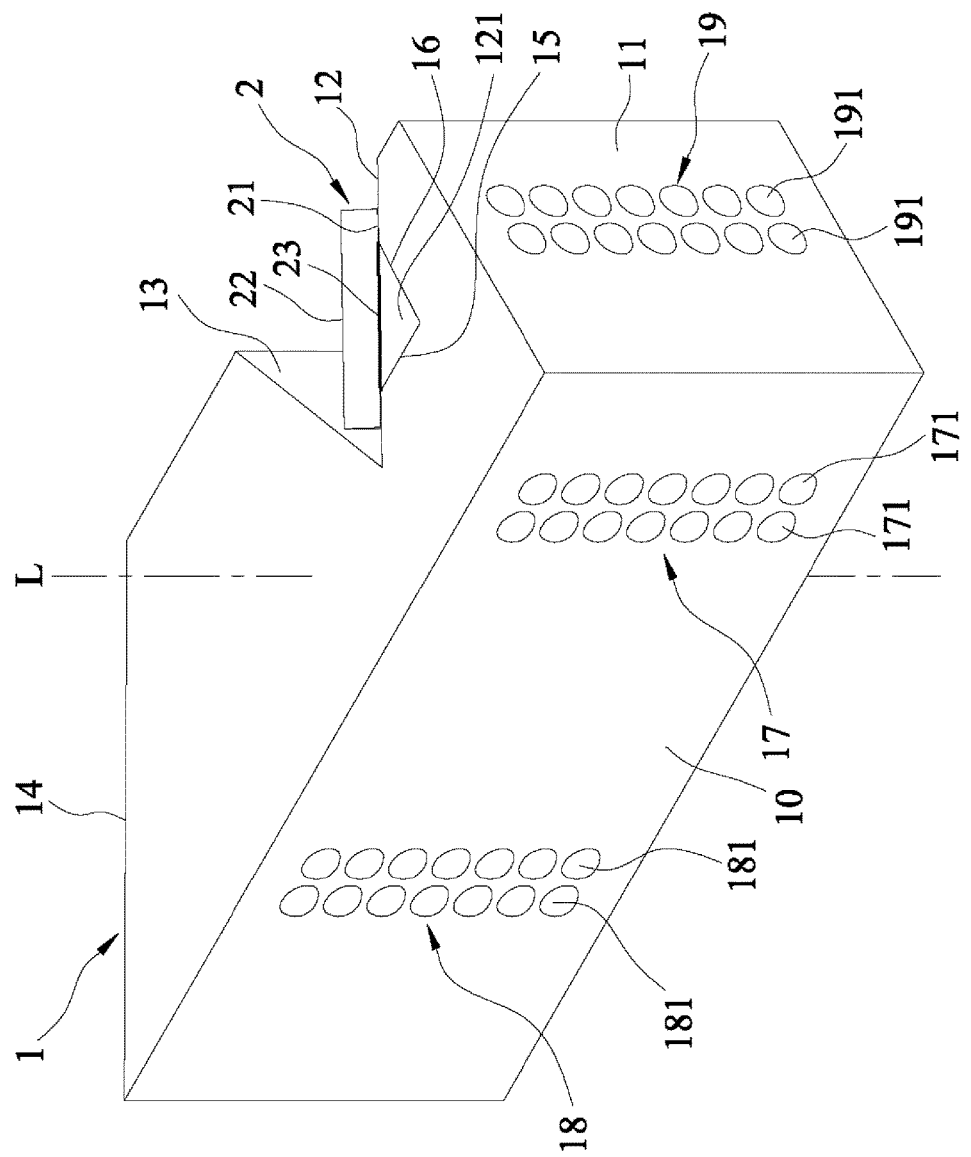
FIG. 3 is a perspective view of the embodiment with a plurality of first protrusions, a plurality of second protrusions and a plurality of third protrusions being arranged in a different way.

The lens component 1 is made of one of glass and plastic. In this embodiment, the lens component 1 is made of plastic, which may be varied in other embodiments. The lens component 1 has a first plane 10, a second plane 11, a third plane 12, a fourth plane 13 and a fifth plane 14. The first, second, third, fourth and fifth planes 10, 11, 12, 13, 14 are disposed around and parallel to a reference axis (L). In this embodiment, the first plane 10 is perpendicular to the second plane 11, and such configuration may be varied in other embodiments. In this embodiment, an angle defined between the first plane 10 and the fifth plane 14 is 45 degrees, and may be varied in other embodiments. The third plane 12 is formed with a groove 121 defined by a sixth plane 15 and a seventh plane 16 which extend obliquely from the third plane 12 and respectively opposite to the first and second planes 10, 11. Each of the sixth and seventh planes 15, 16 extends in a direction that is parallel to the reference axis (L). The lens component 1 further has a first collimating unit 17 and a second collimating unit 18 that are formed on the first plane 10, and a third collimating unit 19 formed on the second plane 11. The first collimating unit 17 has a plurality of rounded first protrusions 171 arranged in a width direction which is parallel to the reference axis (L). The second collimating unit 18 has a plurality of rounded second protrusions 181 arranged in the width direction. The third collimating unit 19 has a plurality of rounded third protrusions 191 arranged in the width direction. It should be noted that, the first protrusions 171 may be arranged in the width direction in one row (see FIG. 1), and may also be arranged in the width direction in two juxtaposed rows (see FIG. 3), the second protrusions 181 may be arranged in the width direction in one row (see FIG. 1), and may also be arranged in the width direction in two juxtaposed rows (see FIG. 3), and the third protrusions 191 may be arranged in the width direction in one row (see FIG. 1), and may also be arranged in the width direction in two juxtaposed rows (see FIG. 3).

The filter 2 is made of one of glass and plastic. In this embodiment, the filter 2 is made of glass, which may be varied in other embodiments. The filter 2 is disposed on the third plane 12 for covering the groove 121, and has a first side surface 21 facing the sixth and seventh planes 15, 16, and a second side surface 22 opposite to the first side surface 21, and facing the fourth plane 13. The first side surface 21 is formed with a plated film 23. It should be noted that, when an incident angle of a light beam is larger than 40 degrees, the plated film 23 has a reflective rate larger than 90%, and when an incident angle of the light beam is smaller than 30 degrees, the plated film 23 has a light transmittance larger than 90%.

When the disclosure is applied to be an optical fiber adapter, the first collimating unit 17 is aligned with a light source unit 3, and the first protrusions 171 of the first collimating unit 17 are respectively aligned with a plurality of light sources 32 of the light source unit 3, the second collimating unit 18 is aligned with a photo detector unit 5, and the second protrusions 181 of the second collimating unit 18 are respectively aligned with a plurality of photo detectors 51 of the photo detector unit 5, and the third collimating unit 19 is aligned with an optical fiber unit 4, and the third protrusions 191 of the third collimating unit 19 are respectively aligned with a plurality of receiving ends 41 of optical fibers 42 of the optical fiber unit 4.

When a light beam 31 of each of the light sources 32 incident through a corresponding one of the first protrusions 171 propagates within the lens component 1 along a first optical path (I) to enter, by refraction through the sixth plane 15, and propagate within the groove 121 to reach the first side surface 21, followed by being reflected by the first side surface 21 to reach the seventh plane 16, a first part of the light beam 31 enters, by refraction through the seventh plane 16, and propagates within the lens component 1 along a second optical path (II) to exit the lens component 1 to reach a corresponding one of the receiving ends 41 of the optical fibers 42 through a corresponding one of the third protrusions 191, and the remaining or second part of the light beam 31 is reflected by the seventh plane 16 to propagate within the groove 121, to thereby enter and propagate within the filter 2, by refraction through the first side surface 21, and subsequently exit the filter 2, by refraction through the second side surface 22 along a monitoring optical path (V), followed by entering and propagating within the lens component 1, by refraction through the fourth plane 13, to reach the fifth plane 14 to thereby be reflected by the fifth plane 14 to exit the lens component 1 to reach a corresponding one of the photo detectors 51 through a corresponding one of the second protrusions 181.

With such disposition, the distance between the light source unit 3 and the photo detector unit 5 is increased without affecting the light energy and the detecting sensitivity. In this embodiment, the second part of each of the light beams 31 of the light sources 32 is totally reflected by the fifth plane 14, such that loss of energy is decreased. It should be noted that, the reflection on the fifth plane 14 may not be a total reflection in other embodiments.

Since the plated film 23 has a reflective rate larger than 90% when the incident angle of each of the light beam 31 is larger than 40 degrees. In this embodiment, the first plane 10 is parallel to the sixth plane 15, and such configuration may be varied in other embodiments. In this embodiment, an angle defined between the sixth plane 15 of the lens component 1 and the first side surface 21 of the filter 2 is 45 degrees, such that the incident angle of the first part of each of the light beams 31 along the first optical path (I) to the plated film 23 is 45 degrees, and most of the first part of each of the light beams 31 can be reflected to propagate along the second optical path (II). The angle defined between the sixth plane 15 and the first side surface 21 may be varied in other embodiments. In this embodiment, an angle defined between the sixth plane 15 and the seventh plane 16 is slightly larger than 90 degrees and smaller than 135 degrees. In such manner, the incident angle of the second part of the light beams 31 relative to the plated film 23 along the monitoring optical path (V) is small, and most of the second part of the light beams 31 can thereby pass through the plated film 23.

The disclosure can guide a part of the light beams 31 into the photo detector unit 5 for monitoring the light energy. Such closed-loop feedback function can increase the stability of the light signals to satisfy the requirement of high bandwidth signal transmission.

In addition, when a laser light source is used as the light source unit 3, it is required to be maintained in a certain working situation so as to have a long service life and a high luminous efficiency. However, laser light signal usually has excess energy so that the optical fiber unit 4 might receive the laser light signal with the energy higher than the optical communication standard. To solve this problem, the material and the structure of the plated film 23 can be varied for decreasing the energy of the laser light signal.

Moreover, since a light beam needs to be reflected by a surface into an optical fiber, and since a receiving distance deviation of the optical fiber is proportional to the distance between a light source and a receiving end of the optical fiber, when the receiving distance deviation is large, only one part of light signal is received by the receiving end, thereby resulting in a failed communication. In this embodiment, since the optical fiber unit 4 and the photo detector unit 5 are respectively disposed at two opposite sides of the light source unit 3, a distance (d) between the light source unit 3 and the optical fiber unit 4 is short, so that a receiving distance deviation is small and a tolerance range of an inclination angle deviation of the first side surface 21 is greatly increased.

In conclusion, with the abovementioned configuration, the optical element of the disclosure has the following advantages:

1. Since the light beams 31 are transmitted into the plated film 23 at different incident angles, they can be both reflected and refracted for transmitting light signals into the optical fiber unit 4 and the photo detector unit 5. Furthermore, with the dispositions of the fourth plane 13 and the fifth plane 14, the distance between the light source unit 3 and the photo detector unit 5 is increased.

2. By changing the material and the structure of the plated film 23, the plated film 23 not only has high reflective rate with respect to the light beams 31 of large incident angles and high light transmittance with respect to the light beams 31 of small incident angles, but also can adjust the energy of the light signal for ensuring that the receiving ends 41 of the optical fiber unit 4 can receive the light signals within the optical communication standard.

3. By decreasing the distance (d) between the light source unit 3 and the optical fiber unit 4, the receiving ends 41 can further fully receive the light signals.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical element with light-splitting function comprising:
   a lens component having a first plane, a second plane, a third plane, a fourth plane, a fifth plane, a first collimating unit that is formed on said first plane, a second collimating unit that is formed on said first plane, and a third collimating unit that is formed on said second plane, said first, second, third, fourth and fifth planes being disposed around and parallel to a reference axis, said third plane being formed with a groove that is defined by a sixth plane and a seventh plane which extend obliquely from said third plane and respectively opposite to said first and second planes, each of said sixth and seventh planes extending in a direction that is parallel to the reference axis; and
   a filter disposed on said third plane for covering said groove, and having a first side surface that faces said sixth and seventh planes, and a second side surface that is opposite to said first side surface, and that faces said fourth plane;
   wherein when light beams incident from said first collimating unit propagate within said lens component along a first optical path to enter, by refraction through said sixth plane, and propagate within said groove to reach said first side surface, followed by being reflected by said first side surface to reach said seventh plane, a part of the light beams enters, by refraction through said seventh plane, and propagates within said lens component along a second optical path to exit said lens component through said third collimating unit, and the remaining part of the light beams is reflected by said seventh plane to propagate within said groove, to thereby enter and propagate within said filter, by refraction through said first side surface, and subsequently exit said filter, by refraction through said second side surface along a monitoring optical path, followed by entering and propagating within said lens component, by refraction through said fourth plane, to reach said fifth plane to thereby be reflected by said fifth plane to exit said lens component through said second collimating unit.

2. The optical element as claimed in claim 1, wherein:
   said first side surface of said filter is formed with a plated film;
   when the incident angles of the light beams are larger than 40 degrees, said plated film has a reflective rate larger than 90%; and
   when the incident angles of the light beams are smaller than 30 degrees, said plated film has a light transmittance larger than 90%.

3. The optical element as claimed in claim 1, wherein said first collimating unit has a plurality of rounded first protrusions arranged in a width direction which is parallel to the reference axis, said second collimating unit has a plurality of rounded second protrusions arranged in the width direction, and said third collimating unit has a plurality of rounded third protrusions arranged in the width direction.

4. The optical element as claimed in claim 1, wherein said lens component is made of one of glass and plastic.

5. The optical element as claimed in claim 1, wherein said filter is made of one of glass and plastic.

6. The optical element as claimed in claim 1, wherein said first plane is perpendicular to said second plane.

7. The optical element as claimed in claim 1, wherein an angle defined between said sixth plane and said seventh plane is larger than 90 degrees and smaller than 135 degrees.

8. The optical element as claimed in claim 1, wherein said first plane is parallel to said sixth plane.

\* \* \* \* \*